(12) United States Patent
Ren et al.

(10) Patent No.: US 12,014,440 B1
(45) Date of Patent: Jun. 18, 2024

(54) WATERMARKING METHOD FOR HIGH-DEFINITION MAP BASED ON INVISIBLE CHARACTERS

(71) Applicant: Nanjing Normal University, Nanjing (CN)

(72) Inventors: Na Ren, Nanjing (CN); Xuchao Lv, Renqiu (CN); Changqing Zhu, Nanjing (CN); Qianwen Zhou, Huai'an (CN); Heyan Wang, Baoding (CN)

(73) Assignee: NANJING NORMAL UNIVERSITY, Nanjing (CN)

( * ) Notice: Subject to any disclaimer, the term of this patent is extended or adjusted under 35 U.S.C. 154(b) by 0 days.

(21) Appl. No.: 18/424,760

(22) Filed: Jan. 27, 2024

(30) Foreign Application Priority Data

May 30, 2023 (CN) .......................... 202310621376.3

(51) Int. Cl.
*G06T 1/00* (2006.01)
*G01C 21/00* (2006.01)
(52) U.S. Cl.
CPC .............. *G06T 1/005* (2013.01); *G01C 21/38* (2020.08); *G06T 2201/0062* (2013.01); *G06T 2201/0063* (2013.01); *G06T 2201/0065* (2013.01); *G06T 2201/0202* (2013.01)
(58) Field of Classification Search
CPC .............. G06T 1/005; G06T 2201/0062; G06T 2201/0063; G06T 2201/0065; G06T 2201/0202; G01C 21/38
See application file for complete search history.

(56) References Cited

U.S. PATENT DOCUMENTS

2017/0316189 A1* 11/2017 Winograd ............. G06F 21/125

OTHER PUBLICATIONS

Nanjing Normal University (Applicant), Supplemental amendment of CN202310621376.3, w/ replacement claims (allowed), Jul. 5, 2023.
CNIPA, Notification to grant patent right for invention in CN202310621376.3, Jul. 11, 2023.

* cited by examiner

*Primary Examiner* — Christopher Wait
(74) *Attorney, Agent, or Firm* — Zhigang Ma

(57) ABSTRACT

A watermarking method for a high-definition map based on invisible characters includes: firstly, establishing mapping relations between invisible characters and bit characters, a space character, and decimal digits; and combining watermark characters with corresponding positions thereof, adding Hamming code into a watermark character sequence, and converting the watermark character sequence into invisible characters to construct a composite watermark character sequence. Before watermark detection, a sequence of elements in map data is scrambled according to logistic chaotic mapping, and then the composite watermark character sequence is embedded according to the scrambled sequence. During watermark detection, the data are preprocessed, a sequence during watermark embedding is obtained, and then watermark information is extracted, errors are corrected, and an error correcting code is removed after correction to obtain final watermark information. According to the watermarking method, watermark embedding and watermark detection can be realized not changing data availability and high-accuracy characteristic.

7 Claims, 6 Drawing Sheets

WATERMARKING METHOD FOR HIGH-DEFINITION MAP BASED ON INVISIBLE CHARACTERS

TECHNICAL FIELD

The disclosure relates to the technical field of geographic information security, particularly to a watermarking method for a high-definition map based on invisible characters.

BACKGROUND

A high-definition map is generally referred to as a highly automated driving map or a high-resolution map, and is of great significance in upgrading a two-dimensional (2D) navigation electronic map. Moreover, the high-definition map has characteristics of higher coordinate accuracy, richer layer information, more detailed road information, and a combination of real-time dynamic information and static map information, and then is widely applied to the field of automated driving. The intelligent automated driving needs to be supported by the high-definition map, and the characteristic of high definition enables the high-definition map to have higher commercial value and confidentiality requirements compared with a common navigation map. However, data leakage, misuse, and illegal transmission in view of the high-definition map will not only affect the development in the field of the automated driving, damage benefits of enterprise, but may also threaten national security. Therefore, there is an urgent need to protect the data of the high-definition map.

OpenDrive is one of formats in view of data standards of the current international mainstream high-definition map, whose data is stored with extensible markup language (XML) syntax in a file with a file extension xodr, and describes static road traffic networks for the automated driving applications. According to the disclosure, an OpenDrive high-definition map is used as a research object and the file with the file extension xodr storing the data of the foregoing map belongs to a textual file, so that digital watermark for the high-definition map under the OpenDrive format can refer to common text watermark algorithms.

However, literatures of *"Information Hiding Method Based On ZIP Document Format"* (Li Bing-bing et al., 2011), *"Research on Digital Watermark Algorithm for Word Documents"* (WANG Zhigang, 2010), and *"Digital Watermarking Algorithm Based on Structure of PDF Document"* (ZHONG Zheng-yan et al., 2012) design corresponding watermark embedding methods based on document structures of ZIP, Word, PDF and specific characteristics thereof, respectively, which are not suitable for the data stored in the file with the file extension xodr. Moreover, a watermark algorithm designed by *"Research on the Method of Text Information Hiding Based on XML"* (Chen L, 2013) is applicable to the XML files, but if an identifier is modified, the data stored in the files is unavailable.

The foregoing algorithms are the watermark algorithms based on the structures of the documents. Literatures of *"Research on performance evaluation benchmark of formatted text watermarking"* (CHEN Qing et al., 2014), and *"Text Digital Watermarking Algorithm Based on Improved Line Shift Coding"* (LI Xuchong et al., 2014) disclose two algorithm, which embed the watermarks by using a method of transforming row spacing and word spacing, but are only applicable to data that supports text formatting. In addition, literatures of *"Big Data Plain Text Watermarking Based on Orthogonal Coding"* (LI Zhao-can et al., 2019), and *"Research on text security hiding algorithm for invisible characters"* (Chen Yini, 2019) disclose two algorithms, which can encode the invisible characters to realize watermark embedding, but there exists a problem of low robustness.

In summary, the existing text watermark algorithms embed the watermarks depending on carrier data structures or format adjustments, but the file with the file extension xodr does not support the adjustments of the document structure and format, and the existing watermark algorithm based on XML file characteristics and invisible characters does not consider the characteristics of the data of the high-definition map under the OpenDrive format and the problem of existed poor robustness. Therefore, in order to solve the deficiency of a watermark algorithm for the OpenDrive high-definition map, the disclosure provides a digital watermarking method suitable for the data of the high-definition map under the OpenDrive format, which can make up for the deficiency.

SUMMARY

The disclosure is provided to solve the above problems in the related art. Therefore, aiming at dual requirements of security and sharing in view of the data of the high-definition map in the practical application, as well as requirements for high accuracy and lossless availability in view of processed data, a watermarking method for a high-definition map based on invisible characters is provided by the disclosure, which realizes embedding and detection of watermark information under conditions that data availability is not changed and the high accuracy is guaranteed.

According to a technical solution of the disclosure, the watermarking method for the high-definition map based on invisible characters includes the following steps:

acquiring a set of identifiers I from data of the high-definition map represented by $I=(I_1, I_2, I_3, \ldots I_i)$, $i \in [1, N]$, N representing a length of the set of identifiers, an identifier $I_i$ in the set of identifiers I including a set of attribute values $I_i$ represented by $I_i=(A_1, A_2, A_3, \ldots A_{n(i)})$, and n(i) representing a length of the set of attribute values corresponding to the identifier $I_i$ in the set of identifiers I;

scrambling an embedding sequence of watermark information based on a logistic map to generate a chaotic sequence, the logistic map being expressed as follows:

$X_{n+1}=f(X_n,\mu)=\mu X_n(1-X_n)$, and an initial condition of the logistic map is as follows:

$$X_0 = \left| \frac{\sin N}{N} \right| + \left| \sum_{i=1}^{N} \frac{\cos n(i)}{n(i)} \right|;$$

scrambling the set of identifiers I and the set of attribute values $I_i$ according to the chaotic sequence generated based on the logistic map to obtain a scrambled set of identifiers I' represented by $I'=(I'_1, I'_2, I'_3, \ldots I'_i)$ and a scrambled set of attribute values I' represented by $I'_i=(A'_1, A'_2, A'_3, \ldots A'_{n(i)})$;

converting the initial condition $X_0$ of the logistic map into an invisible character according to a mapping relationship between decimal characters and invisible characters, and inserting the invisible character into a header identifier of the data of the high-definition map;

adding index position information corresponding to watermark bits of a binary watermark information character sequence W of the watermark information and verification code information into the binary watermark information character sequence W of the watermark information to obtain a composite watermark character sequence represented by WM={wm[j], j∈[0, m−1]}, m representing a length of the composite watermark character sequence, wm[j] representing a watermark character, and j representing an index position corresponding to the watermark character; and obtaining attribute value fields in the scrambled set of attribute values $I'_i$, converting the watermark character wm[j] and the index position wm[j] corresponding to the watermark character into invisible characters based on a mapping relationship between invisible characters and bit characters and a space character, and the mapping relationship between invisible characters and decimal characters, and inserting the invisible characters into ends of the attribute value fields until scrambled sets of attribute values corresponding to identifiers in the scrambled set of identifiers I' are traversed.

The composite watermark character sequence is obtained by the following steps:

generating a plaintext character string according to identification information of the watermark information, and encoding the plaintext character string to generate the binary watermark information character sequence W represented by W={w[i], 0≤i≤$N_1$}, a length of the binary watermark information character sequence W being $N_1$, w[i] representing a watermark character with a value of 0, or 1, or a space, and i representing an index position corresponding to the watermark character with the value of 0 or 1 or the space;

dividing the binary watermark information character sequence W into K copies of binary string sequences by taking the space as a separator, and then storing the K copies of binary string sequences in a binary string set represented by WL={WL[j], 0≤j≤K}, and WL[j] representing a single binary string sequence;

traversing the binary string set WL, performing Hamming code encoding on each of the K copies of binary string sequences, converting the binary string set WL added with the verification code information into a binary character sequence WLStr represented by WLStr={WLStr[l], 0≤l≤L}, a length of the binary character sequence WLStr being L, l representing an index position of a corresponding binary character, and WLStr[l] representing a binary character with a value of 0, or 1, or a space; and obtaining the composite watermark character sequence WM having characters of the index position information and the watermark information, the character of the index position information being represented by the index position l of the corresponding binary character, and the character of the watermark information being represented by the WLStr[l].

In an embodiment, after the scrambled sets of attribute values corresponding to the identifiers in the scrambled set of identifiers I' are traversed, the watermarking method further includes: watermark detection.

In an embodiment, the watermark detection includes the following steps:

obtaining the initial condition $X_0$ in the header identifier of the data of the high-definition map and the set of identifiers I=($I_1, I_2, I_3, \ldots I_i$), i∈[1, N], N representing the length of the set of identifiers, each of the set of identifiers including: the set of attribute values $I_i$=($A_1, A_2, A_3, \ldots A_{n(i)}$), and n(i) representing the length of the set of attribute values corresponding to the identifier $I_i$;

scrambling the set of identifiers I according to a pseudo-random sequence based on the initial condition $X_0$ to obtain the scrambled set of identifiers I'=($I'_1, I'_2, I'_3, \ldots I'_i$) corresponding to the embedding sequence of watermark information, and to obtain the scrambled set of attribute values corresponding to the identifier $I'_i$, which is represented by $I'_i$=($A'_1, A'_2, A'_3, \ldots A'_{n(i)}$);

acquiring each of the attribute value fields in the scrambled set of attribute values $I'_i$, and detecting whether an end of the attribute value field contains an invisible character for traversing the scrambled set of identifiers I':

if the invisible character is contained, restoring the invisible character in the attribute value field to a watermark character fragment WStr by means of reverse mapping according to the mapping relationship between invisible characters and bit characters and a space character, and the mapping relationship between invisible characters and decimal characters, the watermark character fragment WStr being expressed by the following formula:

WStr=value & index; and in the formula, & representing a string concatenation operation, value representing 0, 1 or the space, and index representing the index position information represented by a decimal digit;

obtaining watermark character segments after traversing the scrambled set of identifiers I', sorting the watermark character segments in an ascending order to obtain a set of watermark character segments represented by WStrList=(WStr$_1$, WStr$_2$, WStr$_3$, … WStr$_{N \times n(i)}$), and then analyzing the watermark character segments in the set of watermark character segments WStrList individually for traversing the set of watermark character segments, and determining a character value of an index bit in each of the watermark character segments according to a majority principle;

if the character value of the index bit of the corresponding watermark character segment is not determined by the majority principle or the index and the value of the corresponding watermark character segment are missing, assigning 0 to the value, and assigning a value obtained by incrementing determined index position information of a previous bit of the index bit to the index, and thereby obtaining the composite watermark character sequence WM after traversing the set of watermark character segments; and preforming error correction on error values contained in the composite watermark character sequence WM according to an error correction principle of Hamming code, and removing the verification code information to obtain the binary watermark information character sequence W.

According to another technical solution of the disclosure, a watermarking device for a high-definition map based on invisible characters is provided, including the following units:

an acquisition unit, configured to acquire a set of identifiers I from data of the high-definition map represented by I=($I_1, I_2, I_3, \ldots I_i$), i∈[1, N], N representing a length of the set of identifiers, an identifier $I_i$ in the set of identifiers I including a set of attribute values $I_i$ represented by $I_i$=($A_1, A_2, A_3, \ldots A_{n(i)}$), and n(i) representing a length of the set of attribute values corresponding to the identifier $I_i$ in the set of identifiers I;

a first scrambling unit, configured to scramble an embedding sequence of watermark information based on a logistic map to generate a chaotic sequence, the logistic map being expressed as follows:

$X_{n+1}=f(X_n;\mu)=\mu X_n(1-X_n)$, and an initial condition of the logistic map is as follows:

$$X_0 = \left|\frac{\sin N}{N}\right| + \left|\sum_{i=1}^{N}\frac{\cos n(i)}{n(i)}\right|;$$

a second scrambling unit, configured to scramble the set of identifiers I and the set of attribute values $I_i$ according to the chaotic sequence generated based on the logistic map to obtain a scrambled set of identifiers I' represented by $I'=(I'_1, I'_2, I'_3, \ldots I'_i)$ and a scrambled set of attribute values $I'_i$ represented by $I'_i=(A'_1, A'_2, A'_3, \ldots A'_{n(i)})$;

a first conversion unit, configured to convert the initial condition $X_0$ of the logistic map into an invisible character according to a mapping relationship between decimal characters and invisible characters, and insert the invisible character into a header identifier of the data of the high-definition map;

a sequence generation unit, configured to add index position information corresponding to watermark bits of a binary watermark information character sequence W of the watermark information and verification code information into the binary watermark information character sequence W of the watermark information to obtain a composite watermark character sequence represented by WM={wm[j], j∈[0, m−1]}, m representing a length of the composite watermark character sequence, wm [j] representing a watermark character, and j representing an index position corresponding to the watermark character; and a second conversion unit, configured to obtain attribute value fields in the scrambled set of attribute values $I'_i$, convert the watermark character wm[j] and the index position corresponding to the watermark character wm[j] into invisible characters based on a mapping relationship between invisible characters and bit characters and a space character, and the mapping relationship between invisible characters and decimal characters, and insert the invisible characters into ends of the attribute value fields until scrambled sets of attribute values corresponding to identifiers in the scrambled set of identifiers I' are traversed.

In an embodiment, the sequence generation unit is further configured to:

generate a plaintext character string according to identification information of the watermark information, and encode the plaintext character string to generate the binary watermark information character sequence W represented by W={w[i], 0≤i≤N_1}, a length of the binary watermark information character sequence W being $N_1$, w[i] representing a watermark character with a value of 0, or 1, or a space, and i representing an index position corresponding to the watermark character with the value of 0 or 1 or the space;

divide the binary watermark information character sequence W into K copies of binary string sequences by taking the space as a separator, and then store the K copies of binary string sequences in a binary string set represented by WL={WL[j], 0≤j≤K}, and WL[j] representing a single binary string sequence;

transverse the binary string set WL, perform Hamming code encoding on each of the K copies of binary string sequences, convert the binary string set WL added with the verification code information into a binary character sequence WLStr represented by WLStr={WLStr[l], 0≤l≤L}, a length of the binary character sequence WLStr being L, l representing an index position of a corresponding binary character, and WLStr [i] representing a binary character with a value of 0, or 1, or a space; and obtain the composite watermark character sequence WM having characters of the index position information and the watermark information, the character of the index position information being represented by the index position l of the corresponding binary character, and the character of the watermark information being represented by the WLStr [i].

In an embodiment, the watermarking device further includes: a detection unit, configured to detect the watermark information.

In an embodiment, the detection unit is further configured to:

obtain the initial condition $X_0$ in the header identifier of the data of the high-definition map and the set of identifiers $I=(I_1, I_2, I_3, \ldots I_i)$, i∈[1, N], N representing the length of the set of identifiers, each of the set of identifiers including: the set of attribute values $I_i=(A_1, A_2, A_3, \ldots A_{n(i)})$, and n(i) representing the length of the set of attribute values corresponding to the identifier $I_i$;

scramble the set of identifiers I according to a pseudo-random sequence based on the initial condition $X_0$ to obtain the scrambled set of identifiers $I'=(I'_1, I'_2, I'_3, \ldots I'_i)$ corresponding to the embedding sequence of watermark information, and to obtain the scrambled set of attribute values corresponding to the identifier $I'_i$, which is represented by $I'_i=(A'_1, A'_2, A'_3, \ldots A'_{n(i)})$;

acquire each of the attribute value fields in the scrambled set of attribute values $I'_i$, and detect whether an end of the attribute value field contains an invisible character for traversing the scrambled set of identifiers I':

if the invisible character is contained, restore the invisible character in the attribute value field to a watermark character fragment WStr by means of reverse mapping according to the mapping relationship between invisible characters and bit characters and a space character, and the mapping relationship between invisible characters and decimal characters, the watermark character fragment WStr being expressed by the following formula:

WStr=value & index; and in the formula, & representing a string concatenation operation, value representing 0, 1 or the space, and index representing the index position information represented by a decimal digit;

obtain watermark character segments after traversing the scrambled set of identifiers I', sort the watermark character segments in an ascending order to obtain a set of watermark character segments represented by WStrList=(WStr_1, WStr_2, WStr_3, \ldots WStr_{N×n(i)}), and then analyze the watermark character segments in the set of watermark character segments WStrList individually for traversing the set of watermark character segments, and determine a character value of an index bit in each of the watermark character segments according to a majority principle;

if the character value of the index bit of the corresponding watermark character segment is not determined by the majority principle or the index and the value of the corresponding watermark character segment are missing, assign 0 to the value, and assign a value obtained by incrementing determined index position information of a previous bit of the index bit to the index, and thereby obtaining the composite watermark character sequence WM after traversing the set of watermark character segments; and perform error correction on error values contained in the composite watermark character sequence WM according to an error correction principle of Hamming code, and remove the verification code information to obtain the binary watermark information character sequence W.

In an embodiment, each of the acquisition unit, the first scrambling unit, the second scrambling unit, the first conversion unit, the sequence generation unit, the second conversion unit, and the detection unit is embodied by software stored in at least one memory and executable by the processor.

According to still another technical solution of the disclosure, a non-transitory computer-readable storage medium storing instructions is provided, and when the instructions are executed by a processor, the watermarking method as described above is performed.

The watermarking method for the high-definition map based on invisible characters provided by the technical solution of the disclosure fully considers the characteristics of the high-definition map in the OpenDrive standard format, and the watermarking method is based on the invisible characters and is combined with the Hamming code technology, so that the watermarking method can better resist attacks such as translation, rotation, scaling, and clipping while ensuring data availability and data accuracy, and can complete the embedding and detection of the watermark information.

BRIEF DESCRIPTION OF DRAWINGS

In attached drawings that may not necessarily be drawn to scale, same reference markers can be used to describe similar components in different views. The same reference markers with a letter suffix or different letter suffixes can represent the similar components in different embodiments. The attached drawings generally illustrate various embodiments by taking examples rather than limiting the disclosure, and are used to illustrate the embodiments of the disclosure in combination with contents disclosed in the disclosure. When appropriate, the same reference markers in the attached drawings are used to refer to the same or similar components. Such embodiments are illustrative and not intended as exhaustive or exclusive embodiments of the device or the method of the disclosure.

DETAILED DESCRIPTION OF EMBODIMENTS

Figure 1:
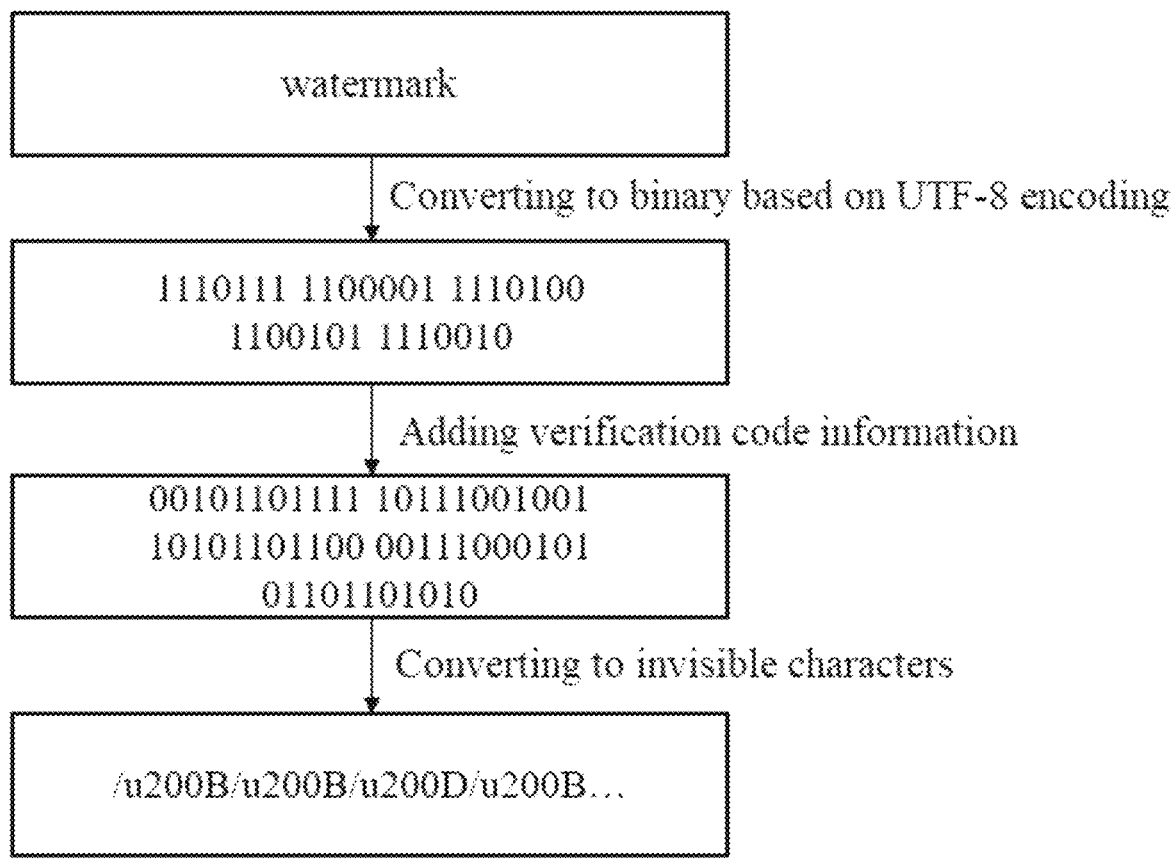
FIG. 1 illustrates a flowchart of constructing a composite watermark character sequence according to an embodiment of the disclosure.

In order to enable those skilled in the related art to better understand the technical solutions of the disclosure, the disclosure will be described in detail below with reference to the attached drawings and illustrated embodiments. The detailed description of the illustrated embodiments of the disclosure with reference to the attached drawings is not limited to the disclosure. The various steps described herein, if there is no necessity for a relationship between each other, should not be taken as a limitation in an order in which the illustrated embodiments are described herein, and those skilled in the related art should know that they may be sequentially adjusted, as long as a logicality between them is not destroyed, causing the entire process not to be implemented.

Aiming at dual requirements of security and sharing of high-definition map data in practical application as well as ensuring high accuracy and lossless availability of processed data, a watermarking method for a high-definition map based on invisible characters is provided, which achieves embedding and detection of watermark information without changing characteristics of availability and high accuracy of the data.

The watermarking method is implemented by the following manner.

First, mapping relationships between invisible characters and bit characters, a space character, as well as decimal digits (also referred as to decimal characters) are established, respectively, which are shown in Tables 1-3.

TABLE 1

| Invisible characters | |
|---|---|
| Invisible character name | Unicode encoding |
| Zero Width Space | U+200B |
| Zero Width Joiner | U+200D |
| Left-To-Right Mark | U+200E |
| Left-To-Right Embedding | U+202A |
| Pop Directional Formatting | U+202C |
| Left-To-Right Override | U+202D |

TABLE 2

| Mapping table between the invisible characters and the bit characters and the space character | |
|---|---|
| Character name | Unicode encoding |
| Bit character 0 | U+200B |
| Bit character 1 | U+200D |
| Space character | U+200E |

TABLE 3

Mapping table between the invisible characters and the decimal characters

| Decimal Character | Unicode encoding |
|---|---|
| 0 | U+200D U+200E |
| 1 | U+200D U+202A |
| 2 | U+202C U+202A |
| 3 | U+202D U+202A |
| 4 | U+202C U+202C |
| 5 | U+202D U+200E |
| 6 | U+200B U+200D |
| 7 | U+200B U+200E |
| 8 | U+200D U+202D |
| 9 | U+200B U+202A |

Watermark characters are combined with corresponding positions, and then Hamming code is added to a watermark character sequence (i.e., containing the watermark characters); and the watermark character sequence added with the Hamming code is converted into invisible characters, thereby to construct a composite watermark character sequence.

Before watermark detection, elements in data of the high-definition map are scrambled according to logistic chaotic mapping, and then the composite watermark character sequence is embedded according to the chaotic sequence of the elements after scrambling.

During watermark detection, the data is preprocessed to obtain an embedding sequence of watermark information, and then the watermark information is extracted according to the obtained embedding sequence, then possible errors existed in the watermark information are corrected according to the Hamming code (i.e., error correcting code, also referred as to verification code information) in the watermark characters, and the error correcting code is removed after correction to obtain the final watermark information.

A basic idea of the disclosure is as follows: firstly, six invisible characters are selected for a large number of strict screenings and testing of Unicode invisible characters, and the selected invisible characters do not affect the normal use of the data when embedded into OpenDrive data, as well as not affect the accuracy of the high-definition map; then the selected invisible characters are combined and mapping relationships between invisible characters and bit characters, space character, and decimal characters are established, respectively; and then the watermark characters are combined with the corresponding positions, the Hamming code is added to the watermark character sequence, and the watermark character sequence added with the Hamming code is converted into the invisible characters to construct the composite watermark character sequence; thereafter, a set of identifiers in a file with a file extension xodr and multiple sets of attribute values corresponding to the set of identifiers are scrambled based on the logistic mapping relationship, and then the watermark character sequence is embedded according to the scrambling sequence of the set of identifiers, and an initial condition of the mapping relationship is converted into an invisible character and then the invisible character is embedded into a header identifier of the data of the high-definition map, which facilitates extracting the initial condition when watermark detection; and during watermark detection, the initial condition is extracted and the data is preprocessed to obtain the embedding sequence of watermark information, and the watermark information is extracted according to the embedding sequence, and then the possible errors existed in the watermark information are corrected according to the Hamming code in the watermark information, and the error correcting code is removed after the correction to obtain the final watermark information.

Figure 2:
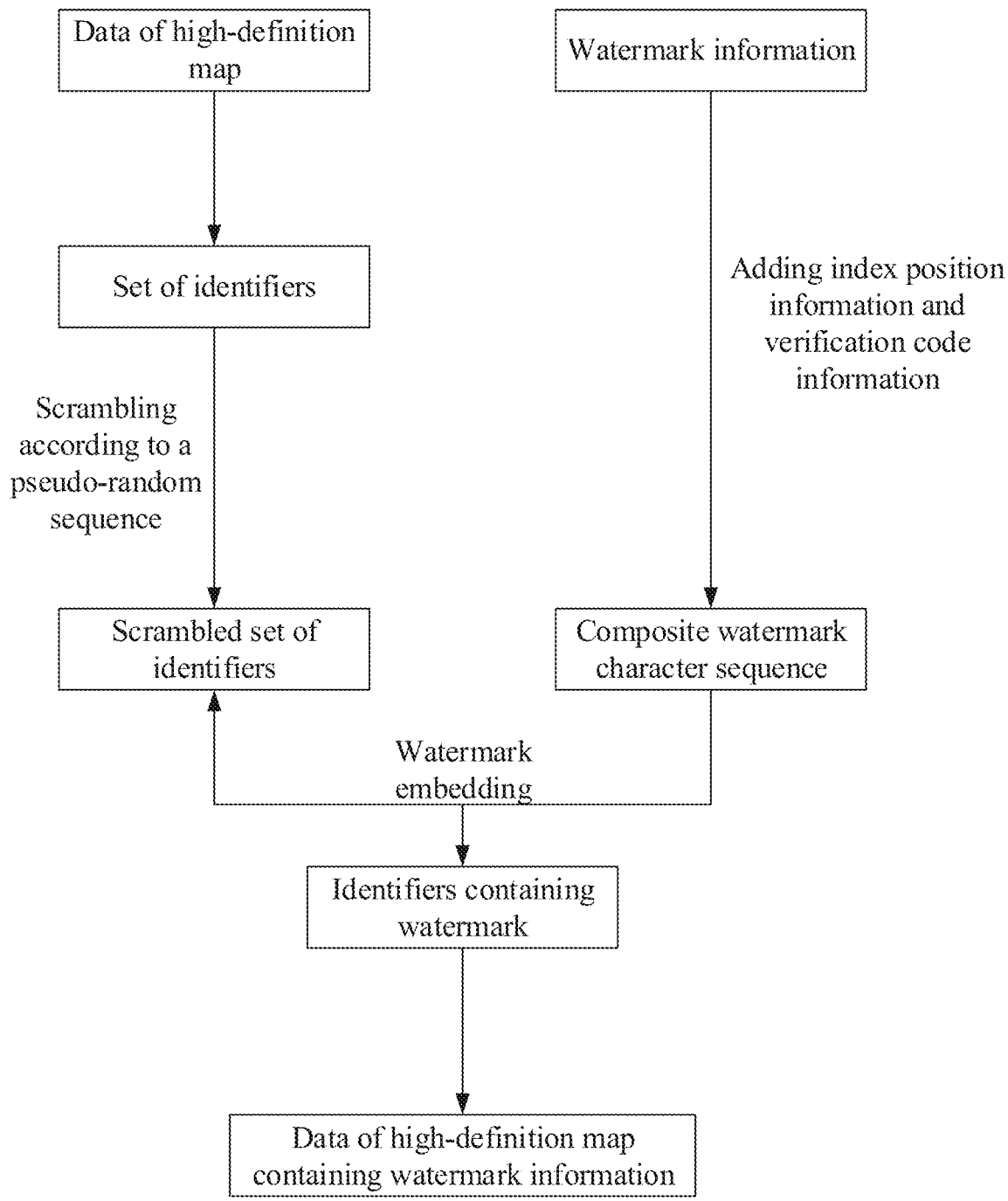
FIG. 2 illustrates a flowchart of watermark embedding according to an embodiment of the disclosure.
Figure 3:
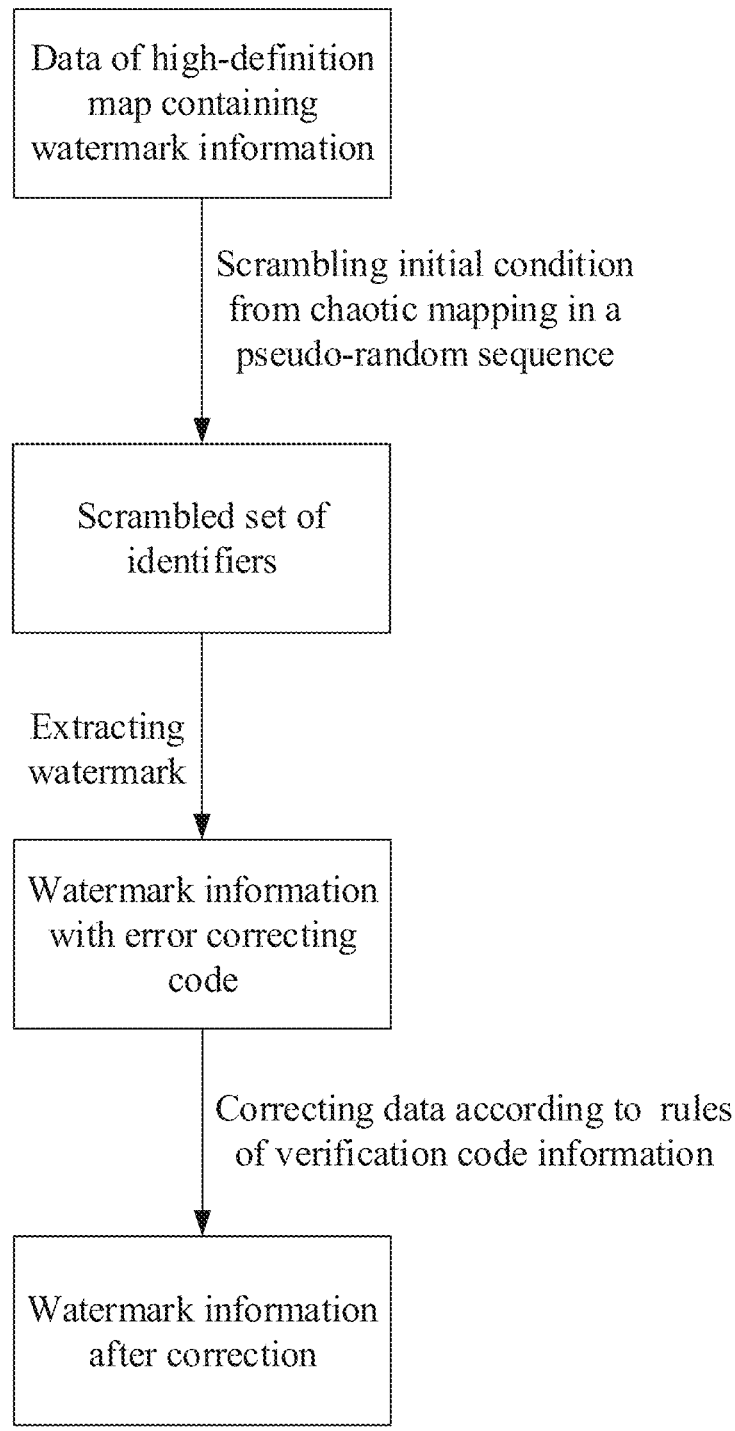
FIG. 3 illustrates a flowchart of watermark detection according to an embodiment of the disclosure.

Based on the basic idea described above, the disclosure designs a watermarking method suitable for an OpenDrive format high-definition map on the basis of invisible characters and in combination with a Hamming code technology. Furthermore, as shown in FIGS. 1-3, the watermarking method includes the following steps.

Step 1 of generating a composite watermark character sequence includes the following steps:
step 1.1, generating a plaintext character string according to identification information of the watermark information, and then performing UTF-8 encoding on the plaintext character string to generate the binary watermark information character sequence W represented by W={w[i], $0 \leq i \leq N_1$}, a length of the binary watermark information character sequence W being $N_1$, w[i] representing a watermark character with a value of 0, or 1, or a space, and i representing an index position corresponding to the watermark character with the value of 0 or 1 or the space;
step 1.2, dividing the binary watermark information character sequence W into K copies of binary string sequences by taking the space as a separator, and then storing the K copies of binary string sequences in a binary string set represented by WL={WL[j], $0 \leq j \leq K$}, and WL[j] representing a single binary string sequence;
step 1.3, traversing the binary string set WL, performing Hamming code encoding on each of the K copies of binary string sequences, converting the binary string set WL added with the verification code information into a binary character sequence WLStr represented by WLStr={WLStr[l], $0 \leq l \leq L$}, a length of the binary character sequence WLStr being L, l representing an index position of a corresponding binary character, and WLStr[i] representing a binary character with a value of 0, or 1, or a space; and
step 1.4, obtaining the composite watermark character sequence WM composed of characters of the index position information and the watermark information.

Specially, the character of the index position information is represented by the index position l of the corresponding binary character obtained in the step 1.3, and the character of the watermark information is represented by the WLStr [l] obtained in the step 1.3.

Therefore, the composite watermark character sequence WM can be expressed as follows:

$$WM=wmStr[index]=WLStr[l]\& String(l), Index=0,1, 2, \ldots, L-1.$$

In the above formula, & represents a string concatenation operation, and String represents an integer digital-to-character string operation.

Step 2 of watermark embedding includes the following steps:
step 2.1, acquiring a set of identifiers I from data of xodr map (i.e., preprocessing the data of the map) represented by I=($I_1$, $I_2$, $I_3$, . . . $I_i$), i∈[1, N], N representing a length of the set of identifiers, an identifier $I_i$ in the set of identifiers I including: a set of attribute values $I_i$ represented by $I_i$=($A_1$, $A_2$, $A_3$, . . . $A_{n(i)}$), and n(i) representing a length of the set of attribute values corresponding to the identifier $I_i$ in the set of identifiers I;
step 2.2, in order to ensure randomness of the embedding sequence of watermark information, scrambling the embedding sequence of watermark information based on a typical logistic map after preprocessing the data; the logistic map being expressed as follows:

$$X_{n+1}=f(X_n,\mu)=\mu X_n(1-X_n); \text{ and}$$

μ representing a bifurcation parameter, $\mu_\infty$ being equal to 3.569945 . . . , when $\mu_\infty<\mu\leq4$, the logistic map being in a chaotic sequence, so that μ in the expression is taken as 4, and an initial condition of the logistic map being as follows:

$$X_0 = \left|\frac{\sin N}{N}\right| + \left|\sum_{i=1}^{N}\frac{\cos n(i)}{n(i)}\right|;$$

and in the initial condition of the logistic map, N and n(i) being positive integers;

step 2.3, scrambling the set of identifiers I and the set of attribute values $I_i$ according to the chaotic sequence generated based on the logistic map to obtain a scrambled set of identifiers I' represented by I'=(I'$_1$, I'$_2$, I'$_3$, . . . I'$_i$) and a scrambled set of attribute values I'$_i$ represented by I'$_i$=(A'$_1$, A'$_2$, A'$_3$, . . . A$_{n(i)}$);

step 2.4, according to a characteristic that a number of header identifier in the xodr file can be only one, converting the initial condition $X_0$ of the logistic map into an invisible character according to a mapping relationship between decimal characters and invisible characters, and inserting the invisible character into the header identifier of the data of the high-definition map, facilitating the watermark information recovering to the corresponding embedding sequence during the watermark detection;

step 2.5, setting the obtained original watermark information sequence (also referred as to a binary watermark information character sequence) as W, adding index position information corresponding to watermark bits of the original watermark information sequence and verification code information into the original watermark information sequence W according to the generation process of the composite watermark character sequence herein, and finally obtaining the composite watermark character sequence represented by WM={wm[j], j∈ [0, m−1]}, m representing a length of the composite watermark character sequence; and step 2.6, reading attribute value fields in the scrambled set of attribute values I', and based on the mapping relationships shown in Table 2 and Table 3, converting the watermark characters wm[j] and the index position corresponding to the watermark character wm [j] into invisible characters, and inserting the invisible characters into ends of the attribute value fields until scrambled sets of attribute values corresponding to identifiers in the scrambled set of identifiers I' are traversed.

Step 3 of watermark detection includes the following steps:

step 3.1, obtaining the initial condition $X_0$ in the header identifier of the data of the high-definition map and the set of identifiers I=(I$_1$, I$_2$, I$_3$, . . . I$_i$), i∈[1, N], N representing the length of the set of identifiers, each of the set of identifiers including: the set of attribute values I$_i$=(A$_1$, A$_2$, A$_3$, . . . A$_{n(i)}$), and n(i) representing the length of the set of attribute values corresponding to the identifier I$_i$;

step 3.2, scrambling the set of identifiers I according to a pseudo-random sequence based on the initial condition $X_0$ to obtain the scrambled set of identifiers I'=(I'$_1$, I'$_2$, I'$_3$, . . . I'$_i$) corresponding to the embedding sequence of watermark information, and to obtain the scrambled set of attribute values corresponding to the identifier I'$_i$, which is represented by I'$_i$=(A'$_1$, A'$_2$, A'$_3$, . . . A'$_{n(i)}$);

step 3.3, circularly reading each of the attribute value fields in the scrambled set of attribute values I'$_i$, and detecting whether an end of the attribute value field contains an invisible character for traversing the scrambled set of identifiers I'$_i$:

if the invisible character is contained, according to the mapping relationships shown in Table 2 and Table 3, restoring the invisible character in the attribute value field to a watermark character fragment WStr by means of reverse mapping, the watermark character fragment WStr being expressed by the following formula:

$$WStr = value \ \& \ index; \text{ and}$$

in the formula, & representing a string concatenation operation, value representing 0, 1 or the space, and index representing the index position information represented by a decimal digit;

step 3.4, obtaining watermark character segments after traversing the scrambled set of identifiers I', sorting the watermark character segments in an ascending order to obtain a set of watermark character segments represented by WStrList=(WStr$_1$, WStr$_2$, WStr$_3$, . . . WStr$_{N\times n(i)}$), and then analyzing the watermark character segments in the set of watermark character segments WStrList individually for traversing the set of watermark character segments, and determining a character value of an index bit in each of the watermark character segments according to a majority principle; and step 3.5, preforming error correction on error values contained in the composite watermark character sequence WM according to an error correction principle of Hamming code, and removing the verification code information to obtain the original watermark information sequence W.

Specially, in the step 3.4, based on a characteristic that the Hamming code can only realize the error correction but cannot fill in a missing value, during the analyzing process, if the character value of the index bit of the corresponding watermark character segment is not determined by the majority principle or the index and the value of the corresponding watermark character segment are missing, the value is assigned to 0, and the index value is assigned to a value obtained by incrementing determined index position information of a previous bit of the index bit, and thereby obtaining the composite watermark character sequence WM after traversing the set of watermark character segments.

According to the watermarking method, the characteristics of the data of the high-definition map in the OpenDrive standard format are fully considered, and the watermarking method is based on the invisible characters and is combined with the Hamming code technology, so that the watermarking method can better resist attacks such as translation, rotation, scaling, and clipping while ensuring data availability and data accuracy, and can complete the embedding and detection of the watermark information.

Moreover, progress and feasibility of the disclosure will be fully explained by referring to illustrated experimental data.

Figure 4:
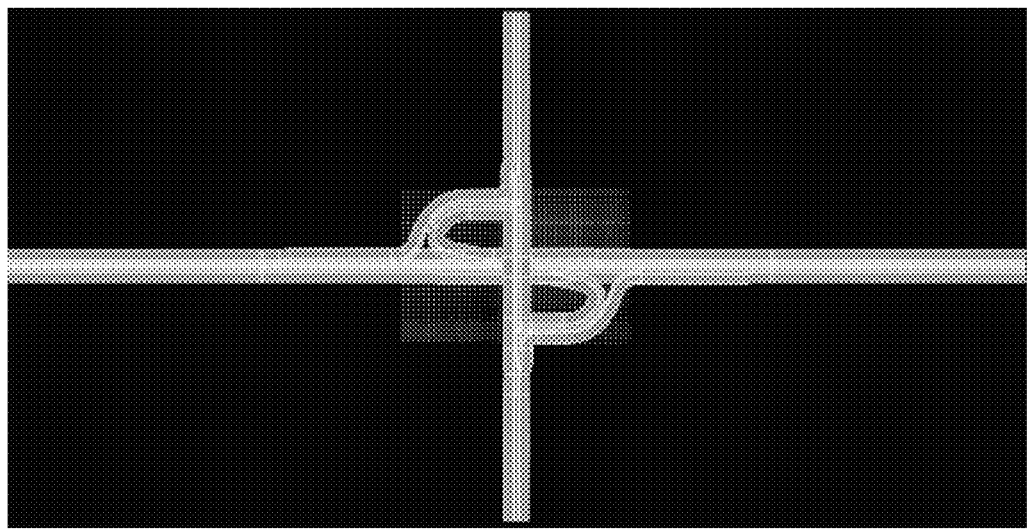
FIG. 4 illustrates experimental data of a watermarking method according to an embodiment of the disclosure.

As shown in FIG. 4, the experimental data to be applied to the disclosure is acquired according to an embodiment of the disclosure. The embodiment selects data of an exemplary road network provided by OpenDrive official website, and the data includes 41 roads, 339 lane segments, and 8 intersections. In view of processes of generation, embedding and detection for the watermark information in the high-definition map, implementation steps are as follows:

step 1 of watermark information generation, including the following steps:

step 1.1, obtaining original watermark information that needs to be embedded;

step 1.2, converting the watermark information into a watermark character sequence composed of binary codes (i.e., binary watermark information character sequence) based on UTF-8 encoding;

step 1.3, adding index position information corresponding to watermark bits of the watermark character sequence into the watermark character sequence; and step 1.4, adding a Hamming code error correcting code (also referred as to verification code information) to the watermark character sequence to generate a composite watermark character sequence;

step 2 of watermark embedding, including the following steps:

step 2.1, generating an initial condition of logistic map according to the number of elements (e.g., roads, lane segments, and intersections) in the data and then converting the initial condition into an invisible character, and inserting the invisible character into a header identifier of the data of the high-definition map;

step 2.2, scrambling identifiers and attribute values corresponding to the identifiers in the data based on logistic map; and step 2.3, embedding the composite watermark character sequence into the attribute values corresponding to the identifiers in the data of the map by multiple times according to the scrambled sequences of the identifiers and the attribute values corresponding to the identifiers;

step 3 of watermark detection, including the following steps:

step 3.1, obtaining the invisible initial condition generated based on the logistic map in the header identifier, and using the logistic map to obtain sequences of the identifiers and the attribute values corresponding to the identifiers when embedding the watermark information;

step 3.2, extracting the composite watermark character sequence in the attribute values; and step 3.3, correcting bit errors that may be generated in the composite watermark character sequence by using the Hamming code, and then removing the Hamming code to obtain the original watermark information.

Figure 5:
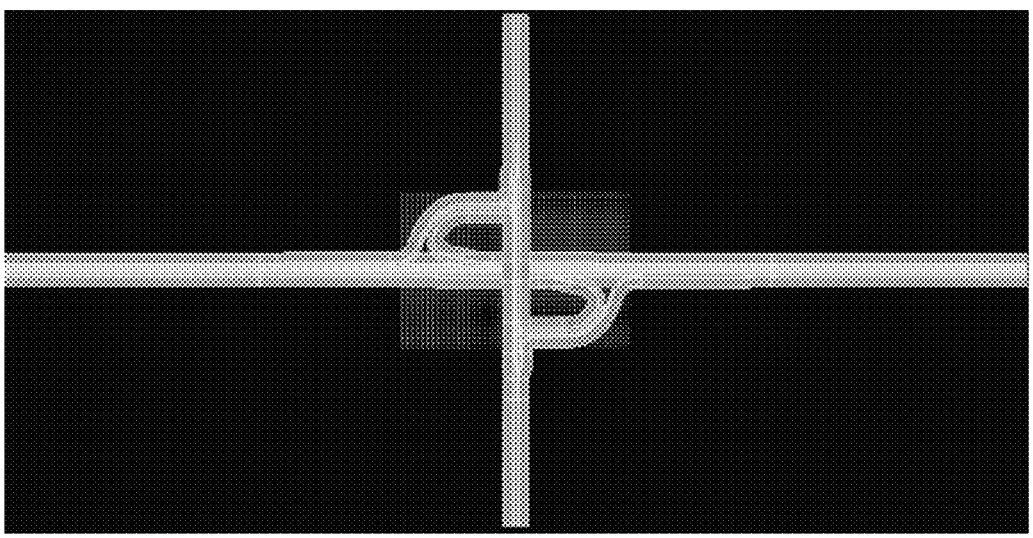
FIG. 5 illustrates data after the watermark embedding by using the watermarking method according to the embodiment of the disclosure.

The data after the watermark embedding using the watermarking method of the disclosure is shown in FIG. 5.

Figure 6:
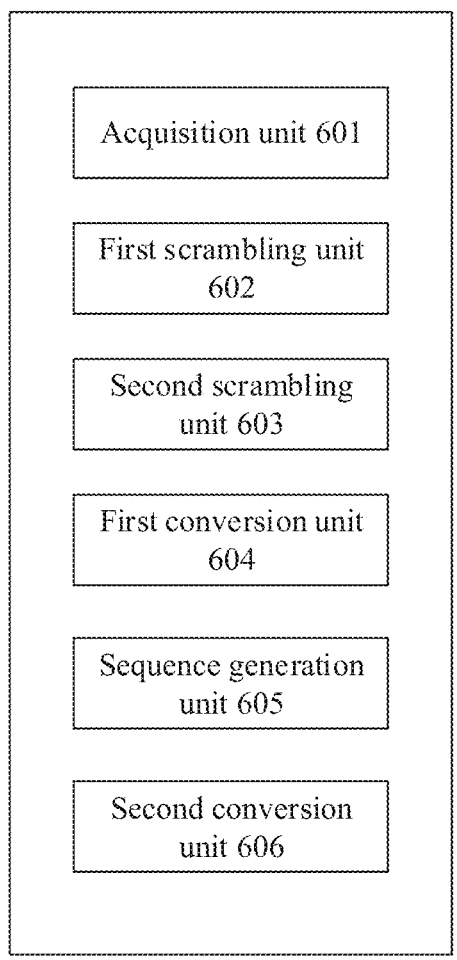
FIG. 6 illustrates a schematic structural diagram of a watermarking device for a high-definition map based on invisible characters.

An embodiment of the disclosure provides a watermarking device for a high-definition map based on invisible characters as shown in FIG. 6, and the watermarking device includes:

an acquisition unit 601, configured to acquire a set of identifiers I from data of the high-definition map represented by $I=(I_1, I_2, I_3, \ldots I_i)$, $i \in [1, N]$, N representing a length of the set of identifiers, an identifier $I_i$ in the set of identifiers I including a set of attribute values $I_i$ represented by $I_i=(A_1, A_2, A_3, \ldots A_{n(i)})$, and n(i) representing a length of the set of attribute values corresponding to the identifier $I_i$ in the set of identifiers I;

a first scrambling unit 602, configured to scramble an embedding sequence of watermark information based on a logistic map to generate a chaotic sequence, the logistic map being expressed as follows:

$X_{n+1}=f(X_n,\mu)=\mu X_n(1-X)$, and an Initial Condition of the Logistic Map being as follows:

$$X_0 = \left| \frac{\sin N}{N} \right| + \left| \sum_{i=1}^{N} \frac{\cos n(i)}{n(i)} \right|;$$

a second scrambling unit 603, configured to scramble the set of identifiers I and the set of attribute values $I_i$ according to the chaotic sequence generated based on the logistic map to obtain a scrambled set of identifiers I' represented by $I'=(I'_1, I'_2, I'_3, \ldots I'_i)$ and a scrambled set of attribute values $I'_i$ represented by $I'_i=(A'_1, A'_2, A'_3, \ldots A'_{n(i)})$;

a first conversion unit 604, configured to convert the initial condition $X_0$ of the logistic map into an invisible character according to a mapping relationship between decimal characters and invisible characters, and insert the invisible character into a header identifier of the data of the high-definition map;

a sequence generation unit 605, configured to add index position information corresponding to watermark bits of a binary watermark information character sequence W of the watermark information and verification code information into the binary watermark information character sequence W of the watermark information to obtain a composite watermark character sequence represented by WM={wm[i], j∈ [0, m−1]}, m representing a length of the composite watermark character sequence, wm [j] representing a watermark character, and j representing an index position corresponding to the watermark character; and a second conversion unit 606, configured to obtain attribute value fields in the scrambled set of attribute values $I'_i$, convert the watermark character wm [j] and the index position corresponding to the watermark character wm [j] into invisible characters based on a mapping relationship between invisible characters and bit characters and a space character, and the mapping relationship between invisible characters and decimal characters, and insert the invisible characters into ends of the attribute value fields until scrambled sets of attribute values corresponding to identifiers in the scrambled set of identifiers I' are traversed.

In some embodiments, the sequence generation unit 605 is further configured to:

generate a plaintext character string according to identification information of the watermark information, and encode the plaintext character string to generate the binary watermark information character sequence W represented by W={w[i], 0≤i≤N_1}, a length of the binary watermark information character sequence W being $N_1$, w[i] representing a watermark character with a value of 0, or 1, or a space, and i representing an index position corresponding to the watermark character with the value of 0 or 1 or the space;

divide the binary watermark information character sequence W into K copies of binary string sequences by taking the space as a separator, and then store the K copies of binary string sequences in a binary string set represented by WL={WL[j], 0≤j≤K}, and WL[j] representing a single binary string sequence;

transverse the binary string set WL, perform Hamming code encoding on each of the K copies of binary string sequences, convert the binary string set WL added with the verification code information into a binary character sequence WLStr represented by WLStr={WLStr[l], 0≤l≤L}, a length of the binary character sequence WLStr being L, l representing an index position of a corresponding binary character, and WLStr[l] representing a binary character with a value of 0, or 1, or a space; and finally obtain the composite watermark character sequence WM having characters of the index position information and the watermark information; the character of the index position information is represented by the index position l of the corresponding binary character, and the character of the watermark information is represented by the WLStr [i].

Figure 7:
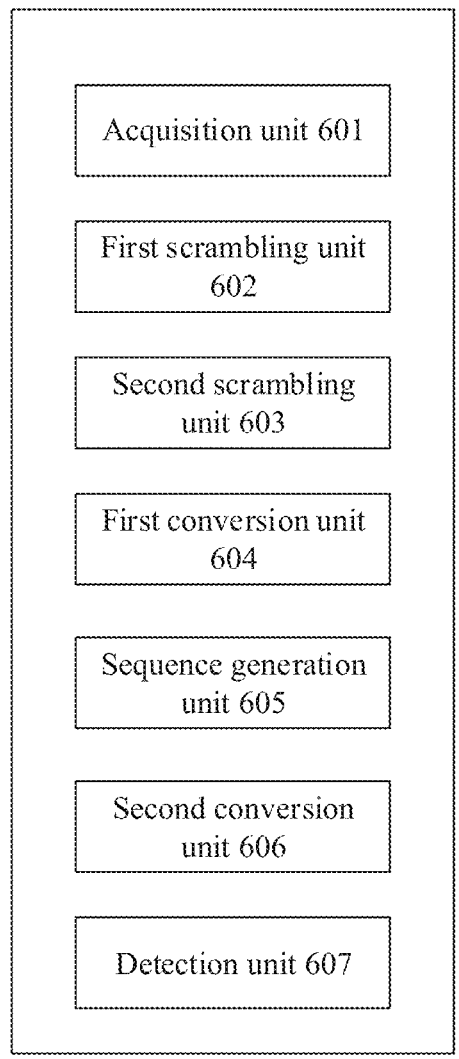
FIG. 7 illustrates a schematic structural diagram of the watermarking device for the high-definition map based on invisible characters having a detection unit.

In some embodiments, as shown in FIG. 7, the watermarking device further includes a detection unit 607, configured to detect the watermark information.

In some embodiments, the detection unit is further configured to:

obtain the initial condition $X_0$ in the header identifier of the data of the high-definition map and the set of identifiers I=($I_1$, $I_2$, $I_3$, . . . $I_i$), i∈[1, N], N representing the length of the set of identifiers, each of the set of identifiers including: the set of attribute values $I_i$=($A_1$, $A_2$, $A_3$, . . . $A_{n(i)}$), and n(i) representing the length of the set of attribute values corresponding to the identifier $I_i$;

scramble the set of identifiers I according to a pseudo-random sequence based on the initial condition $X_0$ to obtain the scrambled set of identifiers I'=(I'$_1$, I'$_2$, I'$_3$, . . . I'$_i$) corresponding to the embedding sequence of watermark information, and to obtain the scrambled set of attribute values corresponding to the identifier I'$_i$, which is represented by I'$_i$=(A'$_1$, A'$_2$, A'$_3$, . . . A'$_{n(i)}$);

acquire each of the attribute value fields in the scrambled set of attribute values I', and detect whether an end of the attribute value field contains an invisible character for traversing the scrambled set of identifiers I':

if the invisible character is contained, restore the invisible character in the attribute value field to a watermark character fragment WStr by means of reverse mapping according to the mapping relationship between invisible characters and bit characters and a space character, and the mapping relationship between invisible characters and decimal characters, the watermark character fragment WStr being expressed by the following formula:

WStr=value & index; and in the formula, & representing a string concatenation operation, value representing 0, 1 or the space, and index representing the index position information represented by a decimal digit;

obtain watermark character segments after traversing the scrambled set of identifiers I', sort the watermark character segments in an ascending order to obtain a set of watermark character segments represented by WStrList=(WStr$_1$, WStr$_2$, WStr$_3$, . . . WStr$_{N \times n(i)}$) and then analyze the watermark character segments in the set of watermark character segments WStrList individually for traversing the set of watermark character segments, and determine a character value of an index bit in each of the watermark character segments according to a majority principle;

if the character value of the index bit of the corresponding watermark character segment is not determined by the majority principle or the index and the value of the corresponding watermark character segment are missing, assign 0 to the value, and assign a value obtained by incrementing determined index position information of a previous bit of the index bit to the index, and thereby obtaining the composite watermark character sequence WM after traversing the set of watermark character segments; and perform error correction on error values contained in the composite watermark character sequence WM according to an error correction principle of Hamming code, and remove the verification code information to obtain the binary watermark information character sequence W.

It should be noted that, the watermarking device for the high-definition map based on invisible characters described in the above embodiment has a same technical idea and a same working principle, and achieves a same technical effect with the previously described watermarking method for the high-definition map based on invisible characters. Therefore, details of the watermarking device are not described herein.

An embodiment of the disclosure further provides a non-transitory computer-readable medium storing instructions that, when executed by a processor, perform the watermarking method according to any one of the embodiments of the disclosure.

Moreover, although the illustrated embodiments have been described herein, the scope of the disclosure still includes any and all of the embodiments with equivalent elements, modifications, omissions, combinations (e.g., technical schemes that cross various embodiments), adaptations, or variations based on the disclosure. The elements in the description are explained in broadest reasonable interpretation standard according to the language of the description, and are not limited to the embodiments described in this specification or during implementation of the disclosure. In addition, embodiments in the disclosure are construed as non-exclusive. Therefore, the specification and the illustrated embodiments are intended to be considered only as examples, and the true scope and spirit of the disclosure are indicated by the full scope of the specification and their equivalents.

The above description is intended to be illustrative and not restrictive. For example, the above-described embodiments (or one or more technical schemes thereof) may be used in combination with each other. Other embodiments may be used, such as those skilled in the related art upon reading the foregoing description. In addition, in the foregoing detailed description, various features may be grouped together to simplify the disclosure, which should not be construed as an intention that the features described in the disclosure are essential to any one embodiment in the disclosure. Rather, the subject matter of the disclosure may be less than all of the features of the illustrated embodiment. Thus, the description is incorporated into the implementation modes of the disclosure as examples or embodiments. Specially, each part of the specification of the disclosure is independently regarded as a separate embodiment, and these embodiments may be combined with each other in various combinations or permutations. The scope of the disclosure should be determined with reference to the above description and the full scope of equivalents to which such description are entitled.

What is claimed is:

1. A watermarking method for a high-definition map based on invisible characters, comprising the following steps:

acquiring a set of identifiers I from data of the high-definition map represented by $I=(I_1, I_2, I_3, \ldots I_i)$, $i \in [1, N]$, N representing a length of the set of identifiers, an identifier $I_i$ in the set of identifiers I comprising a set of attribute values $I_i$ represented by $I_i=(A_1, A_2, A_3, \ldots A_{n(i)})$, and n(i) representing a length of the set of attribute values corresponding to the identifier $I_i$ in the set of identifiers I;

scrambling an embedding sequence of watermark information based on a logistic map to generate a chaotic sequence, wherein the logistic map is expressed as follows:

$X_{n+1}=f(X_n,\mu)=\mu X_n(1-X_n)$, and an initial condition of the logistic map is as follows:

$$X_0 = \left| \frac{\sin N}{N} \right| + \left| \sum_{i=1}^{N} \frac{\cos n(i)}{n(i)} \right|;$$

scrambling the set of identifiers I and the set of attribute values $I_i$ according to the chaotic sequence generated based on the logistic map to obtain a scrambled set of identifiers I' represented by $I'=(I'_1, I'_2, I'_3, \ldots I'_i)$ and a scrambled set of attribute values $I'_i$ represented by $I'_i=(A'_1, A'_2, A'_3, \ldots A'_{n(i)})$;

converting the initial condition $X_0$ of the logistic map into an invisible character according to a mapping relationship between decimal characters and invisible characters, and inserting the invisible character into a header identifier of the data of the high-definition map;

adding index position information corresponding to watermark bits of a binary watermark information character sequence W of the watermark information and verification code information into the binary watermark information character sequence W of the watermark information to obtain a composite watermark character sequence represented by WM={wm[j], j∈[0, m−1]}, m representing a length of the composite watermark character sequence, wm[j] representing a watermark character, and j representing an index position corresponding to the watermark character; and obtaining attribute value fields in the scrambled set of attribute values $I'_i$, converting the watermark character wm[j] and the index position corresponding to the watermark character wm[j] into invisible characters based on a mapping relationship between invisible characters and bit characters and a space character, and the mapping relationship between invisible characters and decimal characters, and inserting the invisible characters into ends of the attribute value fields until scrambled sets of attribute values corresponding to identifiers in the scrambled set of identifiers I' are traversed;

wherein the composite watermark character sequence WM is obtained by the following steps:

generating a plaintext character string according to identification information of the watermark information, and encoding the plaintext character string to generate the binary watermark information character sequence W represented by W={w[i], 0≤i≤$N_1$}, a length of the binary watermark information character sequence W being $N_1$, w[i] representing a watermark character with a value of 0, or 1, or a space, and i representing an index position corresponding to the watermark character with the value of 0 or 1 or the space;

dividing the binary watermark information character sequence W into K copies of binary string sequences by taking the space as a separator, and then storing the K copies of binary string sequences in a binary string set represented by WL={WL[j], 0≤j≤K}, and WL[j] representing a single binary string sequence;

traversing the binary string set WL, performing Hamming code encoding on each of the K copies of binary string sequences, converting the binary string set WL added with the verification code information into a binary character sequence WLStr represented by WLStr={WLStr[l], 0≤l≤L}, a length of the binary character sequence WLStr being L, l representing an index position of a corresponding binary character, and WLStr[l] representing a binary character with a value of 0, or 1, or a space; and obtaining the composite watermark character sequence WM having characters of the index position information and the watermark information, wherein the character of the index position information is represented by the index position l of the corresponding binary character, and the character of the watermark information is represented by the WLStr[l].

2. The watermarking method according to claim 1, wherein after the scrambled sets of attribute values corresponding to the identifiers in the scrambled set of identifiers I' are traversed, the watermarking method further comprises: watermark detection.

3. The watermarking method according to claim 2, wherein the watermark detection comprises the following steps:

obtaining the initial condition $X_0$ in the header identifier of the data of the high-definition map and the set of identifiers $I=(I_1, I_2, I_3, \ldots I_i)$, $i \in [1, N]$, N representing the length of the set of identifiers, each of the set of identifiers comprising: the set of attribute values $I_i=(A_1, A_2, A_3, \ldots A_{n(i)})$, and n(i) representing the length of the set of attribute values corresponding to the identifier $I_i$;

scrambling the set of identifiers I according to a pseudo-random sequence based on the initial condition $X_0$ to obtain the scrambled set of identifiers $I'=(I'_1, I'_2, I'_3, \ldots I'_i)$ corresponding to the embedding sequence of watermark information, and to obtain the scrambled set of attribute values corresponding to the identifier $I'_i$, which is represented by $I'_i=(A'_1, A'_2, A'_3, \ldots A'_{n(i)})$;

acquiring each of the attribute value fields in the scrambled set of attribute values $I'_i$, and detecting whether an end of the attribute value field contains an invisible character for traversing the scrambled set of identifiers I':

if the invisible character is contained, restoring the invisible character in the attribute value field to a watermark character fragment WStr by means of reverse mapping according to the mapping relationship between invisible characters and bit characters and a space character, and the mapping relationship between invisible characters and decimal characters, wherein the watermark character fragment WStr is expressed by the following formula:

WStr=value & index; and in the formula, & represents a string concatenation operation, value represents 0, 1 or the space, and index represents the index position information represented by a decimal digit;

obtaining watermark character segments after traversing the scrambled set of identifiers I', sorting the watermark character segments in an ascending order to obtain a set of watermark character segments represented by WStrList={WStr$_1$, WStr$_2$, WStr$_3$, ... WStr$_{N \times n(i)}$), and then analyzing the watermark character segments in the set of watermark character segments WStrList individually for traversing the set of watermark character segments, and determining a character value of an index bit in each of the watermark character segments according to a majority principle;

if the character value of the index bit of the corresponding watermark character segment is not determined by the majority principle or the index and the value of the corresponding watermark character segment are missing, assigning 0 to the value, and assigning a value obtained by incrementing determined index position information of a previous bit of the index bit to the index, and thereby obtaining the composite watermark character sequence WM after traversing the set of watermark character segments; and preforming error correction on error values contained in the composite watermark character sequence WM according to an error correction principle of Hamming code, and removing the verification code information to obtain the binary watermark information character sequence W.

4. A watermarking device for a high-definition map based on invisible characters, comprising:

an acquisition unit, configured to acquire a set of identifiers I from data of the high-definition map represented by I=(I$_1$, I$_2$, I$_3$, ... I$_i$), i∈[1, N], N representing a length of the set of identifiers, an identifier I$_i$ in the set of identifiers I comprising a set of attribute values I$_i$ represented by I$_i$=(A$_1$, A$_2$, A$_3$, ... A$_{n(i)}$), and n(i) representing a length of the set of attribute values corresponding to the identifier I$_i$ in the set of identifiers I;

a first scrambling unit, configured to scramble an embedding sequence of watermark information based on a logistic map to generate a chaotic sequence, wherein the logistic map is expressed as follows:

$X_{n+1}=f(X_n,\mu)=\mu X_n(1-X)$, and an initial condition of the logistic map is as follows:

$$X_0 = \left| \frac{\sin N}{N} \right| + \left| \sum_{i=1}^{N} \frac{\cos n(i)}{n(i)} \right|;$$

a second scrambling unit, configured to scramble the set of identifiers I and the set of attribute values I$_i$ according to the chaotic sequence generated based on the logistic map to obtain a scrambled set of identifiers I' represented by I'=(I'$_1$, I'$_2$, I'$_3$, ... I'$_i$) and a scrambled set of attribute values I'$_i$ represented by I'$_i$=(A'$_1$, A'$_2$, A'$_3$, ... A'$_{n(i)}$);

a first conversion unit, configured to convert the initial condition X$_0$ of the logistic map into an invisible character according to a mapping relationship between decimal characters and invisible characters, and insert the invisible character into a header identifier of the data of the high-definition map;

a sequence generation unit, configured to add index position information corresponding to watermark bits of a binary watermark information character sequence W of the watermark information and verification code information into the binary watermark information character sequence W of the watermark information to obtain a composite watermark character sequence represented by WM={wm[j], j∈[0, m−1]}, m representing a length of the composite watermark character sequence, wm[j] representing a watermark character, and j representing an index position corresponding to the watermark character; and a second conversion unit, configured to obtain attribute value fields in the scrambled set of attribute values I'$_i$, convert the watermark character wm[j] and the index position corresponding to the watermark character wm[j] into invisible characters based on a mapping relationship between invisible characters and bit characters and a space character, and the mapping relationship between invisible characters and decimal characters, and insert the invisible characters into ends of the attribute value fields until scrambled sets of attribute values corresponding to identifiers in the scrambled set of identifiers I' are traversed;

wherein the sequence generation unit is further configured to:

generate a plaintext character string according to identification information of the watermark information, and encode the plaintext character string to generate the binary watermark information character sequence W represented by W={w[i], 0≤i≤ N$_1$}, a length of the binary watermark information character sequence W being N$_1$, w[i] representing a watermark character with a value of 0, or 1, or a space, and i representing an index position corresponding to the watermark character with the value of 0 or 1 or the space;

divide the binary watermark information character sequence W into K copies of binary string sequences by taking the space as a separator, and then store the K copies of binary string sequences in a binary string set represented by WL={WL[j], 0≤j≤K}, and WL[j] representing a single binary string sequence;

transverse the binary string set WL, perform Hamming code encoding on each of the K copies of binary string sequences, convert the binary string set WL added with the verification code information into a binary character sequence WLStr represented by WLStr={WLStr[l], 0≤l≤L}, a length of the binary character sequence WLStr being L, l representing an index position of a corresponding binary character, and WLStr[l] representing a binary character with a value of 0, or 1, or a space; and obtain the composite watermark character sequence WM having characters of the index position information and the watermark information, wherein the character of the index position information is represented by the index position l of the corresponding binary character, and the character of the watermark information is represented by the WLStr [l].

5. The watermarking device according to claim 4, further comprising: a detection unit, configured to detect the watermark information.

6. The watermarking device according to claim 5, wherein the detection unit is further configured to:

obtain the initial condition $X_0$ in the header identifier of the data of the high-definition map and the set of identifiers $I=(I_1, I_2, I_3, \ldots I_i)$, $i \in [1, N]$, N representing the length of the set of identifiers, each of the set of identifiers comprising: the set of attribute values $I_i=(A_1, A_2, A_3, \ldots A_{n(i)})$, and n(i) representing the length of the set of attribute values corresponding to the identifier $I_i$;

scramble the set of identifiers I according to a pseudo-random sequence based on the initial condition $X_0$ to obtain the scrambled set of identifiers $I'=(I'_1, I'_2, I'_3, \ldots I'_i)$ corresponding to the embedding sequence of watermark information, and to obtain the scrambled set of attribute values corresponding to the identifier $I'_i$, which is represented by $I'_i=(A'_1, A'_2, A'_3, \ldots A'_{n(i)})$;

acquire each of the attribute value fields in the scrambled set of attribute values $I'_i$, and detect whether an end of the attribute value field contains an invisible character for traversing the scrambled set of identifiers I':

if the invisible character is contained, restore the invisible character in the attribute value field to a watermark character fragment WStr by means of reverse mapping according to the mapping relationship between invisible characters and bit characters and a space character, and the mapping relationship between invisible characters and decimal characters, wherein the watermark character fragment WStr is expressed by the following formula:

WStr=value & index; and in the formula, & represents a string concatenation operation, value represents 0, 1 or the space, and index represents the index position information represented by a decimal digit;

obtain watermark character segments after traversing the scrambled set of identifiers I', sort the watermark character segments in an ascending order to obtain a set of watermark character segments represented by WStrList=(WStr$_1$, WStr$_2$, WStr$_3$, . . . WStr$_{N \times n(i)}$), and then analyze the watermark character segments in the set of watermark character segments WStrList individually for traversing the set of watermark character segments, and determine a character value of an index bit in each of the watermark character segments according to a majority principle;

if the character value of the index bit of the corresponding watermark character segment is not determined by the majority principle or the index and the value of the corresponding watermark character segment are missing, assign 0 to the value, and assign a value obtained by incrementing determined index position information of a previous bit of the index bit to the index, and thereby obtaining the composite watermark character sequence WM after traversing the set of watermark character segments; and perform error correction on error values contained in the composite watermark character sequence WM according to an error correction principle of Hamming code, and remove the verification code information to obtain the binary watermark information character sequence W.

7. A non-transitory computer-readable storage medium storing instructions that, when executed by a processor, perform the watermarking method according to claim 1.

* * * * *